March 18, 1930. W. STEVER 1,751,112
SCREW DRIVER AND NUT HOLDER
Filed March 15, 1926

INVENTOR
WILLIAM STEVER
BY
John P. Tarbox
ATTORNEY

Patented Mar. 18, 1930

1,751,112

UNITED STATES PATENT OFFICE

WILLIAM STEVER, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

SCREW DRIVER AND NUT HOLDER

Application filed March 15, 1926. Serial No. 94,651.

This invention relates to an improved device for use in driving screws, bolts and the like and relates more particularly to a device which is adapted for tightening the screw bolts which are used in clamping together adjoining members.

In the construction of all-metal automobile bodies it is the practice to employ a plurality of sheet metal panels which are joined together to form, not only the exterior paneling of the body, but also important structural elements in the body framework itself. In order that these sheet metal panels best serve their purpose without any undue rattling and rumbling between adjacent sections due to loose or otherwise faulty joints therebetween the panels are rigidly joined together, by welding wherever possible and by bolts wherever it becomes impossible because of peculiar panel formations, to effect an efficient weld. But these very same peculiar panel formations make it often as difficult to drive home tightly a screw bolt as to make an efficient weld. Not only is it often difficult to tighten the bolts but the work of so tightening them is ordinarily a slow and tedious one which is an important factor to consider where it becomes necessary to tighten a great many bolts in a single job.

Accordingly, the general object of this invention, is to provide a tool by means of which aforestated objections and disadvantages are obviated. In order to effect this general object a tool is provided in which the driving element is mechanically guided into position to operatively engage the head of a screw or bolt while at the same time a means is provided for holding the nut against rotation.

A further object is to provide a tool of this character in which the guiding means is constructed so as to axially center the driving element of the tool with respect to the screw or bolt.

A still further object is to construct a tool in which the driving element moves freely in the guiding means so that upon driving the screw or bolt home the driving element may be automatically disengaged from the screw or bolt.

A still further object is to provide a means on the tool which is adapted to hold the nut in non-rotative position so that the shank of the screw or bolt may be easily threaded thereinto and the tightening effected in an easy and simple manner.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

In the drawings Fig. 1 is a side elevation partly in cross section showing my improved tool in position for operation.

In the drawings similar reference numerals refer to similar parts wherever they occur.

Figure 1:
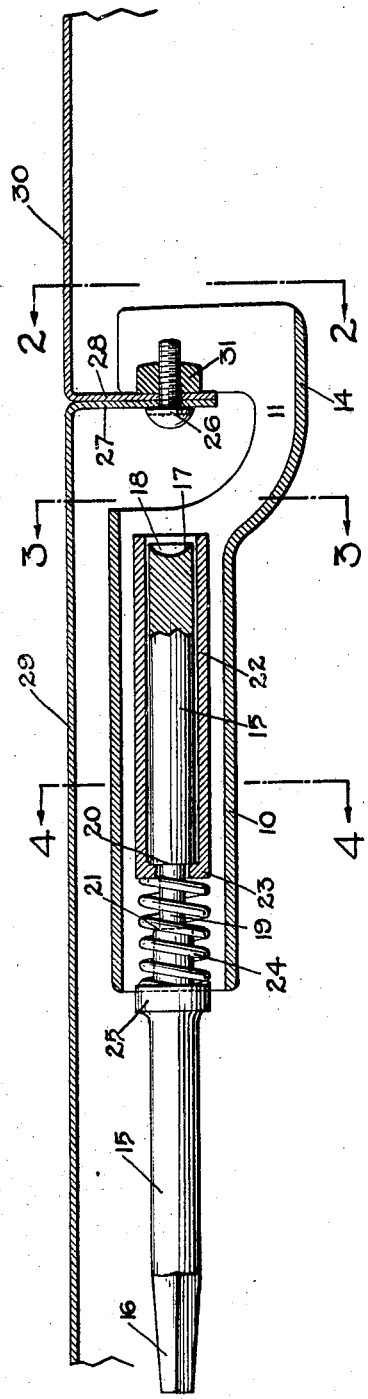
Figure 2:
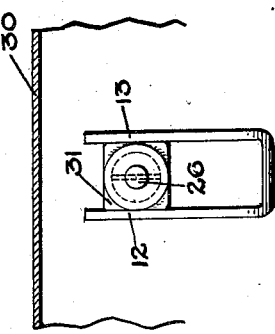
Fig. 2 is a view taken on the line 2—2 of Fig. 1.
Figure 3:
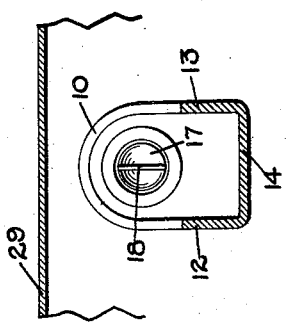
Fig. 3 is a view taken on line 3—3 of Fig. 1.
Figure 4:
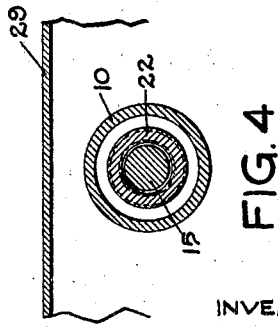
Fig. 4 is a cross sectional view taken on the line 4—4 of Fig. 1.

In the preferred embodiment of my invention herein disclosed, the housing 10 is of substantially tubular form throughout its major extent having at one end thereof hooked-shaped portion 11 which is adapted for normal positioning behind the flanges of the panels which are to be bolted together. This hooked-shaped portion 11 is provided with upstanding arms 12 and 13 which form with an extension 14 from the tubular housing 10 a U-shaped section for a purpose presently to be described.

A driving shaft 15 having its outer end squared as at 16 for operative attachment thereto of an operating device (not shown), either power or hand operated, is inserted within the tubular housing 10. The inner end of the driving shaft is provided with a recessed portion 17 from which longitudinally projects a blade 18 for insertion in the kerf or notch in the screw or bolt head. Intermediate its ends the shaft 15 is provided with a section 19 of reduced diameter forming oppositely presenting shoulders 20 and 21. A tubular guide member 22 of a length somewhat greater than the distance between the shoulder 20 and the inner end of the drive shaft 15 is carried by the latter, the outer end of the member 22 being formed with an end 23 closely embracing the reduced portion 19 of the shaft, the arrangement being such that the guide member is longitudinally movable on the shaft between limits determined by the shoulders 20 and 21. A compression spring 24 operating between an enlarged boss 25 on the shaft and the end 23 of the guide member serves normally to project the guide member longitudinally along the shaft 15 in the position shown in Fig. 1.

In Figure 1 the tool has been shown in its normal position when it is desired to tighten the bolt 26 which is used for bolting together the flanges 27 and 28 of the sheet metal panels 29 and 30, respectively. The bolt is, of course, provided with the nut 31 which is embraced by the arms 12 and 13 of the U-shaped end portion of the housing 10 to retain the same against rotation. It will be seen that by reason of the hooked shape at the inner end of the housing it becomes a simple matter to engage the nut at the far side of the abutting flanges by inserting the tool around the free edges of the flanges. The drive shaft 15 carrying the guide member 22 is then moved axially inwardly until the inner end of the guide members surrounds the head of the bolt 26. The shaft, however, continues its forward movement independently of the guide member 22 until the blade 18 seats in the notch or kerf in the bolt head, the recessed portion 17 at the inner end of the shaft being of material aid in accurately centering the blade 18 in the bolt head slot. The shaft may then be rotated by any suitable device attached to the squared end 16 thereof, the nut 31 being in the meantime held securely against rotation by the upstanding arms 12 and 13 of the tool.

By means of this improved bolt tightening tool bolts can be quickly and easily threaded through the abutting flanges of adjacent panels so as to greatly facilitate quantity production, especially in the manufacture of automobile bodies where the use of sheet metal panels bolted together is great and the saving of time an important factor to be considered. Not only does this improved tool permit quick and satisfactory application of the securing bolts to the members which are to be joined together, but by reason of the blade formation at the inner end of the shaft continued rotation thereof serves, when the screw has been driven home, to disengage the driving shaft from the bolt automatically whereupon it may be readily withdrawn and applied in the tightening of other bolts.

It is to be understood that the structure shown and described is illustrative of principle only and may be embodied in other forms than that shown without departing from the spirit or scope of the following claims.

Having described my invention, what I claim is:

1. In an article of the class described, a driving shaft adapted to engage and rotate a screw, an element mounted on said driving means adapted to engage said screw and guide said driving means into central engagement therewith, a housing receiving and guiding said guiding element for free longitudinal movement therein, a device on said housing adapted to prevent the rotation of the nut while said driving means is operated to thread the screw therethrough, said housing adapted to be grasped by the hand for manipulation, and a manipulating shank on the shaft.

2. In an article of the class described, a driving means adapted to engage and rotate a screw, means mounted on said driving means adapted to engage said screw and guide said driving means into central engagement therewith, a housing adapted to loosely receive and guide said guiding means and said driving means and means on said housing adapted to prevent the rotation of a nut while said driving means is operated to thread the screw therethrough.

In testimony whereof he hereunto affixes his signature.

WILLIAM STEVER.